3,080,224
POLISHING COMPOSITIONS
Howard R. Swift, Toledo, and Edison F. Best, Maumee, Ohio, assignors to Libbey-Owens-Ford Glass Company, Toledo, Ohio, a corporation of Ohio
No Drawing. Filed Feb. 11, 1959, Ser. No. 792,481
15 Claims. (Cl. 51—309)

The present invention relates broadly to polishing compositions.

More particularly, this invention relates to improved rouge polishing compositions.

Still more particularly, this invention relates to polishing compositions made up of rouge, fine glass batch sand, titanium dioxide, tin oxide, either singly or in admixture, along with an additive material consisting of hydrous alpha ferric oxide.

Polishing compositions are widely used in the production of many items having polished surfaces. Particularly in the manufacture of polished plate glass large quantities of such compositions containing rouge, in both the synthetic and/or natural form, are used annually. Compositions having a high removal rate are consistently sought after to increase polishing effectiveness.

Accordingly it is an important object of this invention to provide improved polishing compositions.

It is another object to provide improved rouge polishing compositions containing an additive material consisting of hydrous alpha ferric oxide.

It is a further object to provide improved polishing compositions containing materials such as fine glass batch sand, titanium dioxide, tin oxide and an additive material consisting of hydrous alpha ferric oxide.

These and other objects of the invention will become more apparent during the course of the following description.

It has now been discovered that a removal rate of rouge polishing compositions, both synthetic and natural, may be increased by incorporating therewith hydrous alpha ferric oxide.

It has also been discovered that glass polishing compositions can be made by combining hydrous alpha ferric oxide with materials such as fine glass batch sand, titanium dioxide and tin oxide to improve the removal rate of the latter materials.

Heretofore it has been known to combine various glass polishing materials to provide a desired finish on the polished glass. However in such prior compositions the removal rate has never been found to exceed that of the best member of the composition.

It is accordingly a surprising aspect of the present invention that hydrous alpha ferric oxide, when added to such materials as natural and synthetic rouge, fine glass batch sand, titanium dioxide and tin oxide, is effective to improve the removal rate of these materials. Thus hydrous alpha ferric oxide by itself has a low removal rate, but when admixed with other materials it provides an unexpected result.

In accordance with the present invention hydrous alpha ferric oxide is blended with a polishing material such as natural or synthetic rouge, or the like. The hydrous alpha ferric oxide may be added to the polishing material over a broad range in a ratio from 1 part hydrous alpha ferric oxide: 3 parts polishing material, to as high as 3 parts hydrous alpha ferric oxide: 1 part polishing material. Stated in another way, the hydrous alpha ferric oxide may comprise broadly from 25% to 75% by weight of a blended polishing composition with the remainder of the composition comprising a conventional polishing material such as natural or synthetic rouge, or titanium dioxide, or the like, either singly or in admixture. In a preferred range the hydrous alpha ferric oxide is added to the polishing material in a ratio wherein it comprises from 40% to 60% of the weight of the ultimate composition.

Throughout the present invention, it is to be understood that ferrous sulfate (copperas) is included in the composition to enhance the polishing action of the rouge as is well known in the art.

The advantages of this invention are illustrated in the following examples. The ingredients and their proportions are presented as being typical and should not be construed to limit the invention unduly.

The following are examples of polishing compositions made according to the present invention. All materials were ground to a fineness adapted to pass through a 325 mesh screen.

EXAMPLE I

Parts by wt.
Synthetic rouge_____ 50
Hydrous alpha ferric oxide_____ 50

The synthetic rouge was made by precipitation from a ferric nitrate solution with aqueous ammonia. The precipitate was dried at 110° C., dry ball-milled, heat treated at 1,000° F. for ten minutes, and then wet ball-milled. The final material had a screen size of 325 mesh. That is, the final rouge would pass through a 325 mesh screen.

The production of hydrous alpha ferric oxide is described in detail hereinbelow.

EXAMPLE II

Parts by wt.
Columbian Carbon 33 Superfine Red Synthetic Rouge; a product of The Columbian Carbon Co., 380 Madison Ave., N.Y. 17, N.Y. (97 to 99% $Fe_2O_3$; materials lost on ignition account for most of the remaining 1 to 3%)_____ 50
Hydrous alpha ferric oxide_____ 50

EXAMPLE III

Williams FBH Natural Rouge; a product of The C. K. Williams & Co., Eastern, Pa. (90 to 93% $Fe_2O_3$; the remainder is made up of silica, alumina, plus materials which are lost on ignition)_____ 50
Hydrous alpha ferric oxide_____ 50

EXAMPLE IV

Williams 69R Natural Rouge; a product of The C. K. Williams & Co., Easton, Pa. (88 to 90% $Fe_2O_3$; the remainder is made up of approximately 6% silica, 2% alumina, 1% calcium sulphate, plus other materials which are lost on ignition)_____ 50
Hydrous alpha ferric oxide_____ 50

EXAMPLE V

Fine glass batch sand_____ 50
Hydrous alpha ferric oxide_____ 50

EXAMPLE VI

Titanium dioxide_____ 50
Hydrous alpha ferric oxide_____ 50

EXAMPLE VII

Tin oxide_____ 50
Hydrous alpha ferric oxide_____ 50

To demonstrate the effectiveness of compositions made in accordance with the present invention as compared to the effectiveness of the materials alone, removal rate tests of hydrous alpha ferric oxide and other polishing materials singly, and in compositions according to those stated in Examples I to VII, were made.

In the removal rate test a concentrated slurry of the polishing composition is employed to polish a small test sample of glass during a 10 minute period. Glass removed is determined in milligrams. The polishing is accomplished on an American Optical Company bowl type polishing machine using a plano lap on which is fastened an auto cloth felt pad.

*Table I*

| Material: | Removal rate of glass in 10 minutes, mgs. |
|---|---|
| Hydrous alpha ferric oxide | 23.4 |
| Control Rouge made in accordance with Example I | 70.0 |
| Control Rouge plus hydrous alpha ferric oxide in a 50-50 admixture | 85.0 |
| Columbian Carbon 33 Superfine Red Synthetic Rouge of Example II | 70.0 |
| Columbian Carbon 33 Superfine Red Synthetic Rouge plus hydrous alpha ferric oxide in a 50-50 admixture | 85.0 |
| Williams FBH Natural Rouge of Example III | 75.0 |
| Williams FBH Natural Rouge plus hydrous alpha ferric oxide in a 50-50 admixture | 85.0 |
| Williams 69R Natural Rouge of Example IV | 80.0 |
| Williams 69R Natural Rouge plus hydrous alpha ferric oxide in a 50-50 admixture | 85.0 |
| Fine glass batch sand | 23.6 |
| Fine glass batch sand plus hydrous alpha ferric oxide in a 50-50 admixture | 37.3 |
| Titanium dioxide | 32.6 |
| Titanium dioxide plus hydrous alpha ferric oxide in a 50-50 admixture | 55.6 |
| Tin oxide | 23.1 |
| Tin oxide plus hydrous alpha ferric oxide in a 50-50 admixture | 52.0 |

The above data clearly indicate that hydrous alpha ferric oxide when added to other polishing agents is effective to improve the removal rate of these materials. Thus the removal rate of hydrous alpha ferric oxide itself is low, but when admixed with other materials it provides an unexpected result.

It is further to be noted that in the case of tin oxide, the removal rate was increased to 52.0 mgs. This is more than the combined rates of the two materials taken separately and is an unusually unexpected result.

The hydrous alpha ferric oxide employed in the present invention is made according to the following procedure.

A concentrated solution containing 100 gallons of boiled tap water and 242 pounds of ferric sulfate is heated to 160° F. The sludge that forms is removed by decantation of the solution to a 1000 gallon tank and an additional 375 gallons of boiled tap water is added. One gallon of hydrogen peroxide (30%) is then added and the batch is mixed. Any scum which forms is then removed.

To this mixture 25 gallons of concentrated aqueous ammonia containing approximately 29% $NH_3$ is added and, after rapid stirring, 500 gallons of boiled tap water is added and the whole well mixed. This precipitates the ferric hydroxide.

Reduction of the salt content is then preferably accomplished by repeated settling and decantation. The precipitate is allowed to settle to half of its original volume, the supernatant liquid removed, and fresh boiled water added. After three such treatments the salt content is reduced to a tolerable level.

Five hundred gallons of the settled precipitate is then centrifuged to reduce the salt water to a minimum quickly and effectively. The centrifuging reduces the 500 gallons of settled precipitate to approximately 418 pounds of water, 85.5 pounds of hydrous alpha ferric oxide and 2.7 pounds of salt.

The precipitate is then intially treated with infra-red radiation and finally dried in an oven, the temperature of the precipitate being maintained below about 110° C. The final yield is approximately 84 pounds of hydrous alpha ferric oxide and 2.8 pounds of salt. The hydrous alpha ferric oxide contains about 19% water.

The hydrous alpha ferric oxide is then ground for approximately three hours on a ball mill, the final hydrous alpha ferric oxide being of a particle size adapted to pass through a 325 mesh screen.

The general reaction formula for synthesizing hydrous alpha ferric oxide is given below:

$$Fe_2(SO_4)_3 + 6NH_4OH + XH_2O \rightarrow Fe_2O_3 \cdot XH_2O + 3(NH_4)_2SO_4 + 3H_2O$$

In order to keep the amount of $Fe_2(SO_4)_3$ in the final hydrous alpha ferric oxide to a minimum, the hydrous alpha ferric oxide precipitate should be washed as free as possible of $(NH_4)_2SO_4$ before drying. Any $$(NH_4)_2SO_4$$

in the precipitate will be converted back to $Fe_2(SO_4)_3$ during drying according to the following formula:

$$3(NH_4)_2SO_4 + Fe_2O_3 \cdot xH_2O + drying \rightarrow Fe_2(SO_4)_3 + 6NH_3\uparrow + (3+x)H_2O\uparrow$$

Ferric sulfate has proven to be most satisfying as a synthesizing material in that it is both suitable and inexpensive. Commercial grades of ferric sulfate are available in quantity and are satisfactory if all the ferrous iron is oxidized prior to its use. Ferric nitrate is also suitable, as are other ferric salts, but is more expensive.

If the material is made of pure raw materials, the reactants concentrated, and the reaction temperature maintained not higher than 160° F., crystal growth is extremely slow, possibly due to the high viscosity of the gelatinous mass. However, if chlorides, carbon dioxide, ferrous iron, or other contaminates are present, it has been found that the material produced does not possess the unusual properties exhibited by the hydrous oxide produced from pure raw materials.

Dried at room temperature for a week, the hydrous alpha ferric oxide contains approximately 22% water, and dried at 110° C. for 24 hours, it contains approximately 19% water.

Hydrogen peroxide is added to the solution of the ferric salt prior to the precipitation of the hydrous alpha ferric oxide in order to oxidize the ferrous iron contamination which might be present. Provision must be made to remove any insoluble scum or sludge before precipitation.

Ordinarily, concentrated ammonia is used to precipitate the hydrous alpha ferric oxide and this may be accomplished while flowing continuously through a mixing chamber, but a settling tank is recommended. The temperature of the precipitate should be kept below 160° F. until centrifuged. Approximately 25% more aqueous ammonia is used than calculated by the formula to insure a complete and rapid precipitation.

Reduction of the salt content of the supernatant liquid may be accomplished by either extreme dilution of the precipitate or by settling and decantation. Extreme dilution tends to peptize the precipitate so that repeated settling and decantation of the supernatant liquid is recommended. If the precipitate is allowed to settle to half of its original volume, the supernatant liquid removed, and fresh boiled water added, two or three such treatments should reduce the salt content to a tolerable level.

The best method for forcing the salt water out of the precipitate is by centrifugal force which reduces the salt water content to a minimum quickly and effectively.

For best results the precipitate must be dried in an oven or by infra-red radiation and an initial treatment with infra-red radiation followed up by a final drying in an oven is recommended. The temperature of the precipitate should never get much above 110° C.

Grinding is best accomplished in a ball mill. For best results the final ground hydrous alpha ferric oxide precipitate should pass through a 325 mesh screen. In the laboratory ball milling requires from 2 to 5 hours depending on the amount of hydrous alpha ferric oxide milled and the size of the container.

Although the foregoing disclosure has related to the use of materials ground to a fineness adapted to pass through a 325 mesh screen, the scope of the invention is not to be limited thereto. Particularly in the case of rouge, it is to be understood that coarser materials may be employed inasmuch as rouge is a soft material which is dispersed into platelets under polishing pressures and thereby functions as a polishing material. It is to be understood that the 325 mesh materials provide what is presently considered to be optimum polishing results.

It is to be understood that the form of this invention as illustrated may be modified without departing from the spirit of the invention or the scope of the subjoined claims.

We claim:

1. A composition for use in the polishing of glass and the like, consisting of a mixture comprising a polishing oxide other than hydrous alpha ferric oxide with an amount of hydrous alpha ferric oxide sufficient to aid the polishing but not to exceed 75% of the weight of the composition.

2. A polishing composition as defined in claim 1 wherein the hydrous alpha ferric oxide constitutes between 25% and 75% of the weight of the composiiton.

3. A polishing composition comprising a polishing material selected from the group consisting of substantially anhydrous natural or synthetic rouge, fine glass batch sand, titanium dioxide and tin oxide with an additive material consisting of hydrous alpha ferric oxide in an amount sufficient to aid the polishing but not to exceed 75% of the weight of the composition.

4. A polishing composition as defined in claim 3 wherein the hydrous alpha ferric oxide constitutes between 25% and 75% of the weight of the composition.

5. A polishing composition comprising substantially anhydrous synthetic or natural rouge and an additive material consisting of hydrous alpha ferric oxide in an amount sufficient to aid the polishing but not to exceed 75% of the weight of the composition.

6. A polishing composition as defined in claim 5 wherein the hydrous alpha ferric oxide constitutes between 25% and 75% of the weight of the composition.

7. A polishing composition comprising substantially anhydrous synthetic rouge about 50 parts by weight and hydrous alpha ferric oxide about 50 parts by weight.

8. A polishing composition comprising:

| | Parts by weight |
|---|---|
| Substantially anhydrous natural rouge | 50 |
| Hydrous alpha ferric oxide | 50 |

9. A polishing composition comprising:

| | Parts by weight |
|---|---|
| Fine glass batch sand | 50 |
| Hydrous alpha ferric oxide | 50 |

10. A polishing composition comprising:

| | Parts by weight |
|---|---|
| Titanium dioxide | 50 |
| Hydrous alpha ferric oxide | 50 |

11. A polishing composition comprising:

| | Parts by weight |
|---|---|
| Tin oxide | 50 |
| Hydrous alpha ferric oxide | 50 |

12. A method for producing hydrous alpha ferric oxide which is useful as a polishing composition additive comprising the steps of, precipitating hydrous alpha ferric oxide from an aqueous solution consisting of boiled tap water and ferric sulfate heated to 160° F. with aqueous ammonia, reducing the salt content by washing, compacting the precipitate, drying the precipitate at about 110° C. to about 19 weight percent water, and then grinding the precipitate in a ball mill to a particle size adapted to pass through a 325 mesh screen.

13. A method for producing a polishing composition comprising, precipitating hydrous alpha ferric oxide from an aqueous solution consisting of boiled tap water and ferric sulfate heated to 160° F. with aqueous ammomnia, reducing the salt content by washing, compacting the precipitate, drying the precipitate at about 110° C. to about 19 weight percent water, grinding the precipitate in a ball mill to a particle size adapted to pass through a 325 mesh screen, and blending into said ground precipitate substantially anhydrous rouge in a ratio wherein the hydrous alpha feric oxide comprises between 25% and 75% of the weight of the composition.

14. The method of polishing a glass surface including the steps of, applying to said surface under polishing conditions a composition containing substantially anhydrous rouge blended with hydrous alpha ferric oxide in a ratio wherein the hydrous alpha ferric oxide constitutes between 25% and 75% of the weight of the composition, sufficient ferrous sulfate to render the rouge active as a polishing material, and water.

15. The method of polishing a glass surface as defined in claim 14 wherein the hydrous alpha ferric oxide is the product of precipitating hydrous alpha ferric oxide from an aqueous solution consisting of boiled tap water and ferric sulfate heated to 160° F. with aqueous ammonia, reducing the salt content by washing, compacting the precipitate, drying the precipitate at about 110° C. to about 19 weight percent water, and then grinding the precipitate in a ball mill to a particle size adapted to pass through a 325 mesh screen.

References Cited in the file of this patent

UNITED STATES PATENTS

| | | |
|---|---|---|
| 480,840 | Ecker et al. | Aug. 16, 1892 |
| 1,560,659 | Burket | Nov. 10, 1925 |
| 2,396,398 | Turbett | Mar. 12, 1946 |
| 2,597,182 | Rickner et al. | May 20, 1952 |
| 2,634,193 | Noponen | Apr. 7, 1953 |
| 2,653,081 | Stephens | Sept. 22, 1953 |
| 2,654,194 | Raab | Oct. 6, 1953 |
| 2,877,104 | Robie | Mar. 10, 1959 |
| 2,934,416 | Harris et al. | Apr. 26, 1960 |